July 10, 1923.
H. W. HAHN
PIPE COUPLING
Filed Jan. 25, 1922
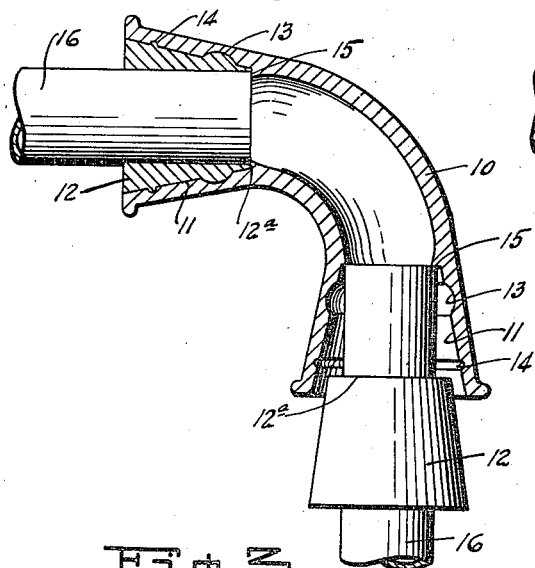
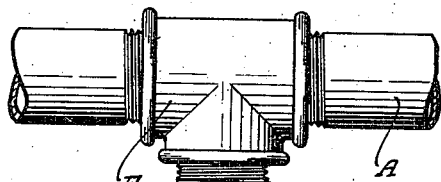
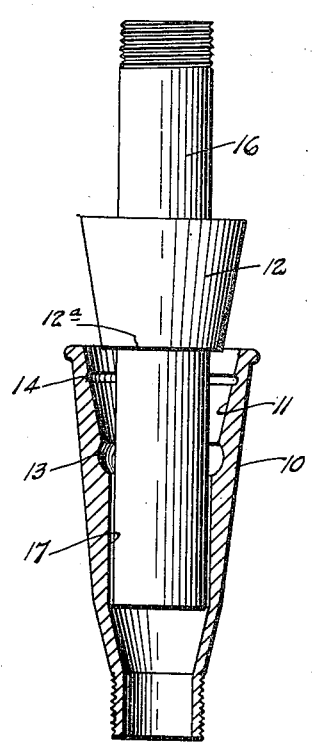
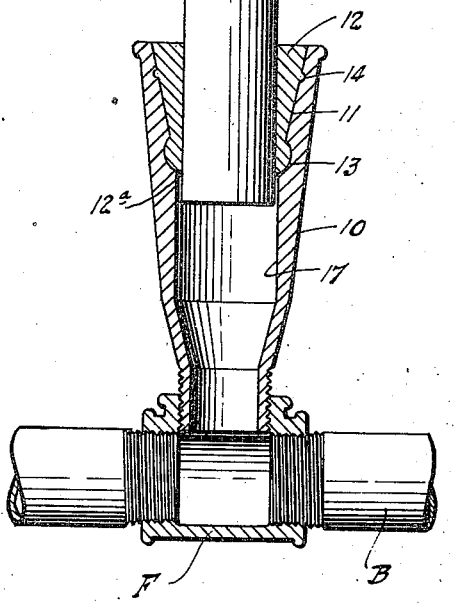
Inventor
Henry W. Hahn
By Watson E. Coleman
Attorney Patented July 10, 1923.

1,461,482

UNITED STATES PATENT OFFICE.

HENRY W. HAHN, OF DENVER, COLORADO.

PIPE COUPLING.

Application filed January 25, 1922. Serial No. 531,667.

*To all whom it may concern:*

Be it known that I, HENRY W. HAHN, a citizen of the United States, residing at Denver, in the county of Denver and State of Colorado, have invented certain new and useful Improvements in Pipe Couplings, of which the following is a specification, reference being had to the accompanying drawings.

This invention relates to pipe couplings, and more particularly to a pipe coupling or connection for use in drainage and venting systems.

An important object of the invention is to provide a leaded coupling which may be completed after the insertion of the pipe into the joint by the driving in of a caulking ring which is of tapered construction so that in driving the ring in the ring will be swelled and tightened to engage the pipe and fitting throughout its length.

I am aware that caulking rings have been used in conjunction with couplings of the straight hub type but these rings are unsatisfactory due to the fact that where the leaded ring is of uniform thickness throughout its length the major portion of the expansion of the caulking ring will take place at the point where the hammer blow is applied to the caulking ring, i. e., at the upper end thereof, and accordingly the upper end of the joint is tight whereas the inner end thereof is loose. Furthermore, in the usual type of hub coupling, the lead about the joint being of considerable thickness, permits of considerable play of the inserted pipe due to the thickness of the lead and to the condition above referred to as a result of driving in the caulking ring. It will, of course, be understood that with a straight caulk it is necessary that the caulking ring be substantially of the same size as the opening into which it fits as otherwise it would be practically imposible to drive the ring in as it would swell in the center. With the use of a tapered caulking ring the longitudinal resistance afforded by the inner end of the ring is much less than that afforded by the outer end and accordingly the swelling effect resulting from blows upon the outer end will be first applied to the inner end and the inner end of the joint will be made tight.

A further object of the invention is to provide in combination with a fitting having a tapered pipe receiving opening, a tapered caulking ring therefor formed of lead or any analogous material which is larger at the inner or smaller end than the inner or smaller end of the fitting opening so that in order to seat the same it is necessary to apply considerable force, thus swelling the inner end of the coupling into engagement with the pipe and maintaining the same in engagement with the walls of the fitting.

A further object of the invention is to provide in a fitting having a tapered opening such as above described and in conjunction with a caulking ring of this type, a groove adjacent the lower or smaller end of the taper of the fitting into which the lead of the caulking ring may swell to lock the caulking ring in position, this swelling being materially assisted by the tapered construction of the caulking ring, as hereinbefore set forth.

These and other objects I attain by the use of the construction and arrangement employed in the accompanying drawings in which for the purpose of illustration are shown preferred embodiments of my invention and in which like reference characters designate like parts throughout.

In the drawings:—

Figure 1 is a sectional view showing an L coupling constructed in accordance with my invention;

Figure 2 is a side elevation partially in section showing a slip joint coupling for connecting two rigid pipes, and Figure 3 is a view of the slip joint coupling removed, showing the position of the same prior to its insertion.

Referring now more particularly to the drawings, the numeral 10 indicates a pipe fitting of any desired form, such as an L, T, Y or the like. In accordance with my invention the pipe receiving openings of the fitting are provided with a tapered opening 11, the outer end of which is considerably larger than the diameter of a pipe employed in conjunction with the fitting and the inner end of which is but slightly greater in diameter than the pipe. A tapered caulking ring 12 is likewise supplied, the inner or smaller end 12ª of which is of greater diameter than the inner or smaller end of the conical opening 11. The side wall of the opening 11 is grooved adjacent its inner or smaller end to form an annular pocket 13 and if desired, the wall of the opening may be provided adjacent its outer end with an annular pocket 14. These pockets may be made in any desired number and size, in the present illustration the pocket 13 being illustrated as the larger. The inner end of the tapered opening is characterized by a shoulder 15 against which a pipe 16, inserted in the tapered opening of the fitting, is adapted to engage.

In the use of my invention the pipe is first inserted in the fitting until it engages the shoulder, the caulking ring 12 having first been applied to the pipe with its inner or smaller end directed toward the fitting. The ring 12 is then driven into the fitting and due to the wedging action of the side walls and to the fact that the inner end of the ring is larger than the inner end of the bore into which it extends, force must be applied to the ring to seat it. This force, as hereinbefore stated, acts first upon the reduced or smaller end of the caulking ring causing the same to firmly engage against the pipe and fill the tapered opening around the pipe. Due, however, to the small amount of space remaining in the tapered opening 11 after the positioning of the pipe therein, the amount of lead driven into the lower or inner extremity of the joint is not sufficient to permit its working around the edges of the pipe in such a manner as to obstruct the flow of drainage through the pipe and fitting. Attention is directed to the fact that the inner edges of the completed joint, as shown in Figures 1 and 2 are wafer like and accordingly have not sufficient inherent strength to force the pipe longitudinally away from the shoulders 15 against the binding action of the caulking ring.

In the form shown in Figures 2 and 3, I have shown a fitting particularly adapted for use in connecting two rigid pipes, designated A and B, which are each provided with a fitting F for the reception of a connecting pipe. Heretofore it has been necessary to employ, in making such connections, either a piece of pipe having a long screw thread on one end or the construction known as the right and left coupling and the flange union. All of these devices are comparatively expensive to construct and require a much longer time to install than the fitting shown in these figures in which the fitting 10 is shown as provided with the tapered opening 11 similar to the fittings illustrated in Figure 1, but having the shoulder 15 omitted and the internal diameter of the fitting at the lower end of the tapered opening 11 of sufficient size to permit the insertion therein of the connecting pipe. This enlarged bore is continued for the desired distance and the remainder of the fitting is tapered and provided at its lower or engaging end with external screw threads for engaging with the usual type of fitting F.

In the use of this form of my invention the pipe 16 is inserted in the fitting and into the bore 17 thereof so that the pipe and fitting operate with a telescoping action and their combined lengths are less than the distance between adjacent faces of the fitting F of the rigid pipes A and B. The pipe 16 and fitting 10 are then engaged with their respective fittings F and screwed tightly into position, the caulking gland 12 having been first applied to the pipe 16 in the manner hereinbefore set forth. After the fitting and pipe are firmly engaged, the gland is driven into position. In this use it is preferred that the pipe 16 be of sufficient length to project to the lower end of the tapered bore 11. The forcing of the ring into position will bind the pipe in position in the fitting and the waferlike edges thereof will not extend alongside the pipe a sufficient distance to be exposed beyond the end thereof to cause interference with drainage.

From the foregoing it is believed to be obvious that I have devised a fitting and caulking gland therefor which is particularly well adapted for use in that in the application of the caulking gland the same is firmly engaged with the fitting and pipe throughout its length and by reason of the fact that it permits of a much more readily installed and cheaper construction than the devices heretofore employed. It will likewise be obvious that some change and modification is possible in the construction of both the fittings and caulking ring without in any manner departing from the spirit of my invention and I accordingly do not limit myself to the specific embodiments thereof hereinbefore illustrated except as hereinafter claimed.

What I claim is:

1. A pipe fitting, comprising a bell having a tapered bore, a pipe extending into said bore, the wall of the tapered bore of the bell being provided adjacent the inner end thereof, but spaced therefrom, with an angular groove, and a soft metal caulking ring pressed into the space between the pipe and the walls of the bore and extending into and fitting said groove.

2. A pipe fitting, comprising a bell having a tapered bore, a pipe extending into said bore, the wall of the tapered bore of the bell being provided adjacent the inner end thereof, but spaced therefrom, with an angular groove, and a soft metal caulking ring pressed into the space between the pipe and the walls of the bore and extending into and fitting said groove, said caulking ring prior to its application being tapered and having the inner end thereof larger than the smaller end of the bore and smaller than the bore at the outer end of the groove.

In testimony whereof I hereunto affix my signature.

HENRY W. HAHN.